United States Patent
Karr et al.

(10) Patent No.: US 7,860,476 B1
(45) Date of Patent: Dec. 28, 2010

(54) NARROWBAND INTERFERENCE EXCISION IN THE EXTERNAL CONTROLLER OF AN IMPLANTED MICROSTIMULATOR NETWORK

(75) Inventors: Lawrence J. Karr, Santa Monica, CA (US); Joseph H. Schulman, Santa Clarita, CA (US); Howard H. Stover, Pasadena, CA (US)

(73) Assignee: Alfred E. Mann Foundation For Scientific Research, Santa Clarita, CA (US)

( * ) Notice: Subject to any disclaimer, the term of this patent is extended or adjusted under 35 U.S.C. 154(b) by 595 days.

(21) Appl. No.: 12/002,202

(22) Filed: Dec. 13, 2007

Related U.S. Application Data (60) Provisional application No. 60/874,880, filed on Dec. 14, 2006.

(51) Int. Cl.
*H04B 1/10* (2006.01)

(52) U.S. Cl. ...................................... 455/296; 455/306

(58) Field of Classification Search ................ 455/41.1, 455/63.1, 67.11, 67.13, 296, 303, 304, 305, 455/306, 307; 375/345, 349, 350; 235/375, 235/392
See application file for complete search history.

(56) References Cited

U.S. PATENT DOCUMENTS

| | | | |
|---|---|---|---|
| 5,410,750 A * | 4/1995 | Cantwell et al. | 455/306 |
| 7,237,712 B2 * | 7/2007 | DeRocco et al. | 235/375 |
| 2010/0114243 A1 * | 5/2010 | Nowak et al. | 455/90.2 |

* cited by examiner

*Primary Examiner*—Thanh C Le
(74) *Attorney, Agent, or Firm*—Malcolm J. Romano

(57) ABSTRACT

Communication techniques are described that can improve signal reception from an implanted wireless device to a main control unit (MCU) while in the presence of a narrowband interferer. The implanted wireless device can be any appropriate device such as a microtransponder, microstimulator, a sensor device or a drug delivery device. The MCU captures samples of signals emanating from the wireless device during an expected transmission time interval. The captured samples are evaluated and transformed into a series of spectral terms that are then evaluated to identify narrowband interference signals. The identified narrowband interference terms can be initialized to a null value to remove the signal spectrum resulting from the communication, and an inverse transformation can be used to generate a time domain signal that is free from interference. Overlapping windows and other signal processing techniques can also be applied to improve overall communications.

20 Claims, 6 Drawing Sheets

NARROWBAND INTERFERENCE EXCISION IN THE EXTERNAL CONTROLLER OF AN IMPLANTED MICROSTIMULATOR NETWORK

CROSS-REFERENCE TO RELATED APPLICATION

This utility application claims the benefit under Title 35 United States Code §119(e) of U.S. Provisional Patent Application No. 60/874,880, which was filed on Dec. 14, 2006, and which is hereby incorporated by reference.

FIELD OF THE INVENTION

The present disclosure relates generally to an apparatus, system and method for facilitating communications between an implanted microstimulator and a non-implanted master control unit when in the presence of a narrowband interferer.

BACKGROUND OF THE INVENTION

Bionics is a discipline focusing on the application of advanced technologies to biological systems. Generally speaking, a bionic is a manufactured device or engineered tissue that substitutes for, or augments, the function of a natural limb, organ or other portion of a biological body. Although commonly thought of within the context of science fiction, significant strides have been made in the field of bionics. Research in bionics offers the possibility of restoring function to impaired and damaged biological systems.

Example applications of bionic devices include sensing and stimulating nerves in the body, such as is described in U.S. Pat. No. 6,829,508, entitled "Electrically sensing and stimulating system for placement of a nerve stimulator or sensor", which is hereby incorporated by reference. Additional examples of Bionic devices include restoration or improvement of damage hearing such as is described in U.S. Pat. No. 6,572,531 entitled "Implantable Middle Ear Implant, and U.S. Pat. No. 6,648,813, entitled "Hearing Aid System Including Speaker Implanted In Middle Ear", which are both incorporated herein by reference.

While bionics cannot cure many of the ailments that exist, current developments present a number of opportunities for improving quality of life, and exciting new research in the field of Bionics continues in such areas as drug delivery systems for chronic disabilities, neuromuscular stimulation devices that enable the activation or enhancement of motion to replace lost or impaired motor control, microstimulators to treat chronic disorders of the central nervous system, as well as many others.

An example body implantable device is described in U.S. patent application Ser. No. 09/030,106 entitled "Battery Powered Patient Implantable Device", incorporated herein by reference, which describes body implantable devices for performing stimulation of body tissues, sensing of various body parameters, and communication to other devices external to the patient's body. The implanted devices can utilize a wireless communication means, such as described in U.S. Pat. No. 7,237,712 entitled "Implantable Device and Communication Integrated Circuit Implemented Therein", incorporated herein by reference. The wireless communication of the body implanted device can be facilitated by an antenna such as described in U.S. Pat. No. 6,804,561, entitled "Antenna For Miniature Implanted Medical Device", which is incorporated herein by reference.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE PREFERRED EMBODIMENT

Various embodiments are described more fully below with reference to the accompanying drawings, which form a part hereof, and which show specific example embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Briefly stated, the present disclosure relates generally to communication techniques for improving signal reception for a main control unit (MCU) that communicates with an implanted wireless device while in the presence of a narrowband interferer. The implanted wireless device can be any appropriate device such as a microtransponder, microstimulator, a sensor device or a drug delivery device. The MCU captures samples of signals emanating from the wireless device during an expected transmission time interval. The captured samples are evaluated and transformed into a series of spectral terms that are then evaluated to identify narrowband interference signals. The identified narrowband interference terms can be initialized to a null value to remove the signal spectrum resulting from the communication, and an inverse transformation can be used to generate a time domain signal that is free from interference. Overlapping windows and other signal processing techniques can also be applied to improve performance.

The described wireless implanted devices can be any appropriate device including, but not limited to transponder devices, microtransponder devices, stimulator devices, microstimulator devices, sensor devices, drug delivery devices, and bionic devices in general. In one example, a Bion device can be configured to stimulate or influence a sensory system (e.g., another neural path), a physiological control system (e.g., muscular contraction), or the brain. In such examples, the sensory device is placed internal to the body (e.g., a Bion) and arranged to wirelessly communicate with a master control unit (MCU) that is external to the body. Many varieties of circuits can be arranged to provide such functions where sensory information is relayed, processed, data-logged, or otherwise handled and communicated. However, such communications can be impaired by various noise sources and interference. The presently described systems, apparatuses and methods are arranged to address the noise and interference signals created by a narrowband interferer.

The examples described herein are only to be construed as example applications for body implanted wireless devices. Many embodiments can be made without departing from the spirit and scope of the invention and the invention resides in the claims that follow this disclosure.

Example Operating Environment

Figure 1:
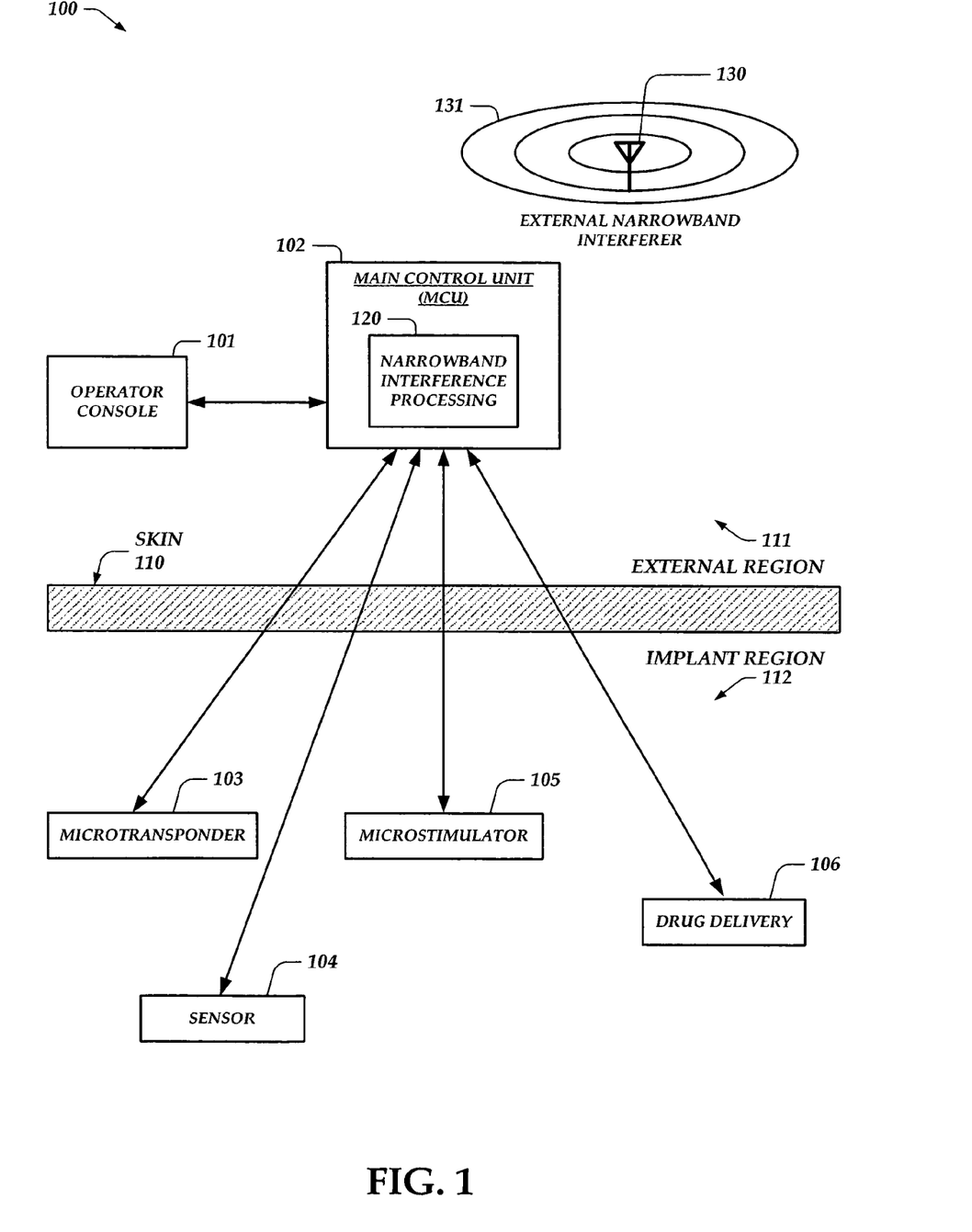
FIG. 1 is a block diagram illustrating an example operating environment for the present disclosure.

FIG. 1 is a block diagram illustrating an example operating environment (100) for the present disclosure. As illustrated in FIG. 1, an example system may include a main control unit or MCU (102) and one or more wireless communication devices (103-106). An operator console (101) can be arranged to communicate, either wirelessly or via a wired transmission, with the MCU (102). The MCU (102) is located in an external region (111) with respect to the body. Any number of wireless communication devices (103-106) can be arranged in communication with the MCU (102) via a wireless communication system that is arranged according to the presently disclosed methods.

Example wireless communication devices include: a microtransponder device (103), a sensory device (104), a stimulator device (105), and a drug delivery device (106). The microtransponder device (103) may be useful as a part of a locator system, where the device may be body implantable device. The sensory device (104) may be useful to collect sensory information such as may be useful for a body implanted neural prosthetic device, or to monitor sensory information for other purposes such as heart rate monitoring, etc. The stimulator device (105) may be useful to stimulate neural pathways in a body implanted application. The drug delivery device (106) is useful in body implanted application where precise drug delivery is desired. Each of the functions of the described wireless communication devices may be combined into a single device, or separated into multiple devices as may be desired for a particular application. The various sensory information and other reporting messages are communicated from the wireless communication device to the MCU (102) such as via a short bust RF communication signal.

An externally located narrowband interferer (130) generates various noise and interference signals (131) that emanate from the point source location as depicted in FIG. 1. Such signals may impair wireless communications between the wireless communication devices (103-106) and the MCU (102). The MCU includes specialized narrowband interference processing means (120) to account for the presence of the narrowband interference, and minimize the adverse effects of the narrowband interferer (130) to improve communications.

While many of the above described examples are for medical-type body implantable devices, these examples are merely for illustrative purposes. The present disclosure contemplates all varieties of wireless communication applications including but are not limited to body implanted applications, non-implanted applications, medical applications and non-medical applications.

Figure 2:
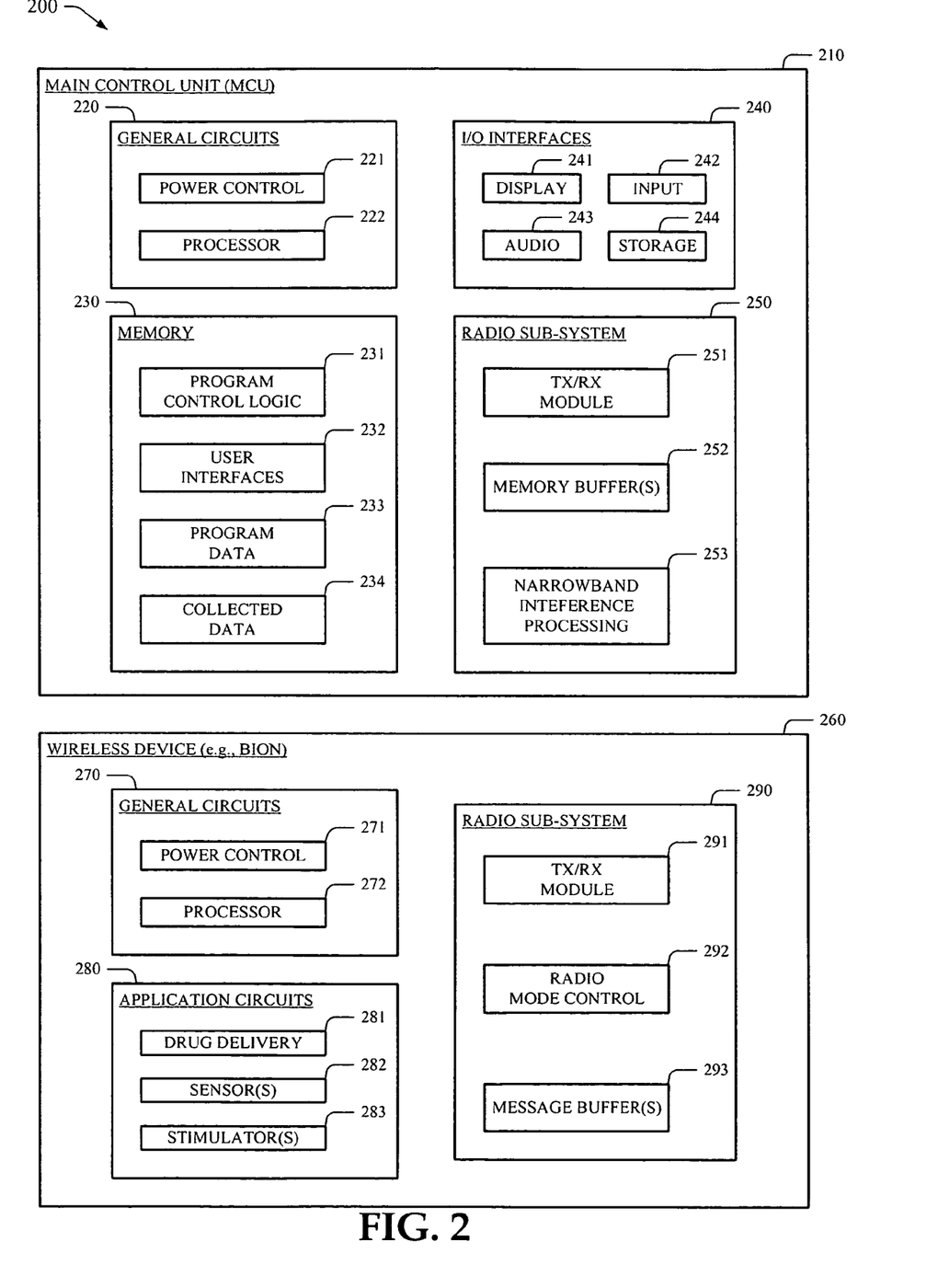
FIG. 2 is a schematic diagram illustrating an example main control unit (MCU) and an example wireless device.

FIG. 2 is a schematic diagram (200) illustrating an example MCU (210) and/or an example wireless device (260) such as a Bion. The MCU is illustrated as having four main functional partitions, namely, general circuits (220), a memory (230), I/O interfaces (240), and a radio sub-system (250). The general circuits (220) include power control functions (221) and processor functions (222). The memory (230) may be include both volatile memory and non-volatile memory types as may be required in a particular application, and includes storage for application program control logic (231), user interfaces (232), program data (233), and collected data (234). The I/O interfaces (240) may include analog and/or digital circuits that include functional mechanisms for a display (241), an input (242), an audio (243), and a storage (244). The radio sub-system includes functions for a transmitter/receiver or TX/RX module (251), one or more memory buffers (252), and narrowband interference processing (253). The radio sub-system (250) in the MCU (210) can be arranged to encode and decode radio transmissions to/from the wireless device (260). Although described above in terms of various partitions, one or more of the functional partitions can be combined and/or separated into other physical and/or functional partitions.

The wireless device (260) is illustrated as having three main functional partitions, namely, general circuits (270), application circuits (280), and a radio sub-system (290). The general circuits (260) include power control functions (261) and processor functions (262). Memory (not shown) may be necessary for operation of the processor (272) similar to that previously described. The application circuits (280) may include one or more drug delivery circuits (281), sensor circuits (282), and/or stimulator circuits (283). The radio sub-system (290) includes functions for a transmitter/receiver or TX/RX module (291), a radio mode control (292), and one or more message buffers (293). The radio sub-system (290) in the wireless device (260) can be arranged to encode and decode radio transmissions to/from the MCU (210). Although described above in terms of various partitions, one or more of the functional partitions can be combined and/or separated into other physical and/or functional partitions.

The MCU (210) can be configured to operate in body implanted applications or in non-implanted applications as previously described. The wireless device (260) can transmit control messages via the radio sub-system (240) and process the received messages (e.g., sensory data, etc.) via the processor (232), utilizing programs and user interfaces that are available in the memory (230). In some applications, sensory data is stored in the memory (230) as the collected data (234). In other instances, the MCU (210) is arranged transmit additional control messages to one or more wireless devices (260) to activate various stimulators (e.g., 283) or drug delivery mechanisms (281) in response to the processed sensory data. The power control circuits (231) can be used to monitor and conserve power in body implanted applications of the MCU (210) by powering down various unnecessary circuit functions, and waking various circuit functions either in response to a received message indicating a sensory event, or in response to a predetermined wake-up time interval.

The wireless device (260) can be configured to operate as a Bion such as in body implanted applications or in a non-implanted application such as wearable microtransponder in a locator system. The wireless device (260) can receive control messages from the MCU (210) via the radio sub-system (290) and process the control messages via the processor (272). In response to the control messages, the wireless device (260) can activate any necessary application circuits (280) to collect sensory data via the sensors (282), or deliver drugs via the drug delivery devices (281), or stimulate muscular and/or neural activity with the stimulator devices (283). Sensory data can then be communicated back to the MCU with the radio system (290). The power control circuits (271) can be used to monitor and conserve power in such body implanted applications by powering down various unnecessary circuit functions, and waking various circuit functions either in response to a control message, in response to a sensory event, or in response to a predetermined wake-up time interval.

Examples of processor circuits include both general processing devices and application specific circuits (ASICs). Examples of general processing devices include microprocessors, microcontrollers, and digital signal processing (DSP) processors. Such processors may be complex instruction set computer (CISC) based processor devices or reduced instruction set computer (RISC) based processors. In some instances the processing functions can be provided by a programmable logic device or PLD such as a generic array logic or gate array logic (GAL) device, a programmable electrically erasable logic (PEEL) device, a complex PLD (CPLD), and a field-programmable gate array logic (FPGA) device, to name a few.

Examples of volatile memory include random access memory (RAM), dynamic random access memory (DRAM), a synchronous dynamic random access memory (SDRAM), a double-data rate SDRAM (DDR SDRAM, DDR2 SDRAM, etc.), to name a few. Examples of non-volatile memory include read only memory (ROM), programmable read only memory (PROM), erasable PROM (EPROM), electrically erasable PROM (EEPROM), static random access memory (SRAM), and flash-type memory, to name a few.

Observations and Effects of Narrowband Interference

Figure 6:
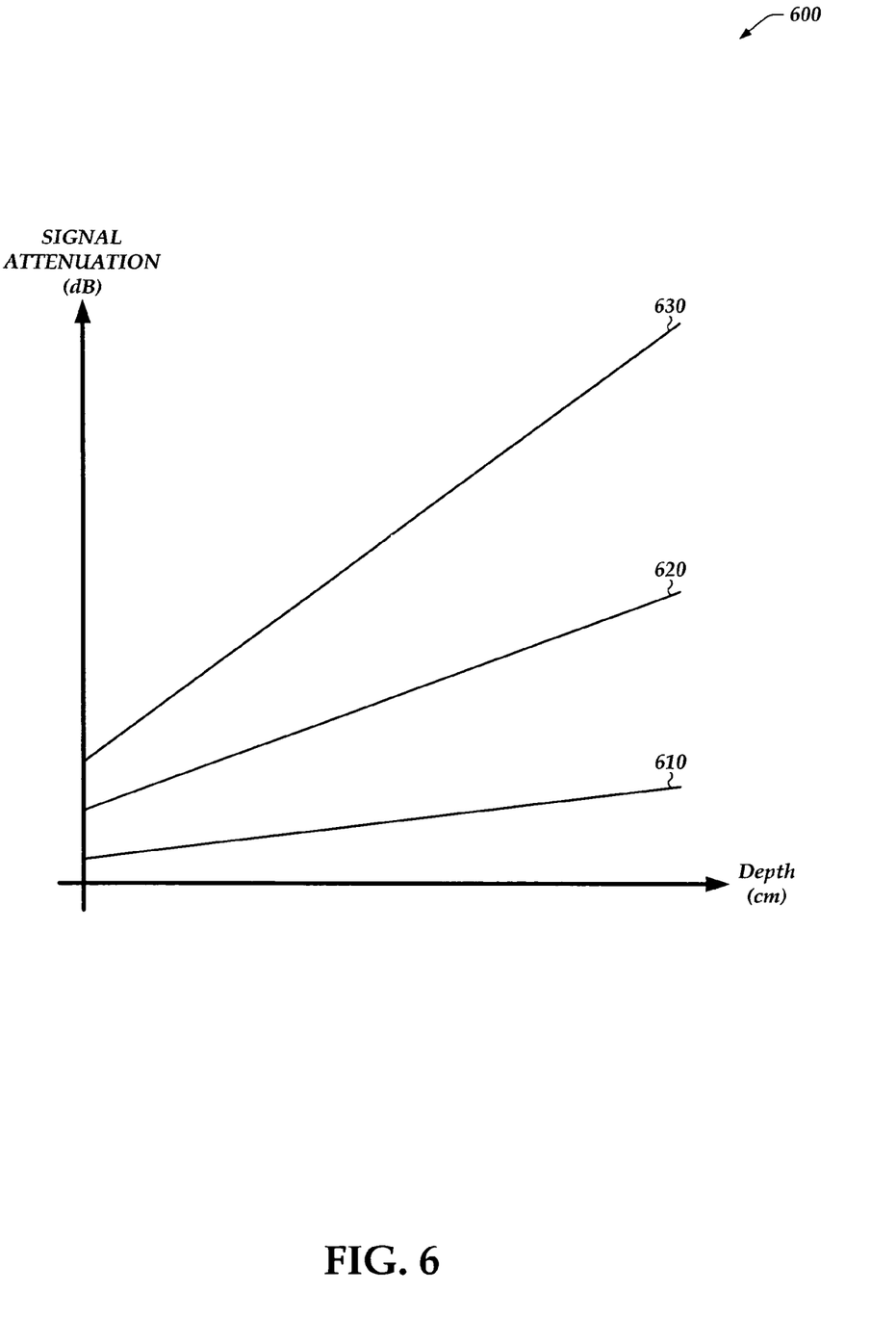
FIG. 6 is a graphical diagram illustrating signal attenuations from the skin interface for a microstimulator, all arranged in accordance with at least some aspects of the present disclosure.

Body implanted wireless devices are typically shielded from external interference as a function of the signal attenuation that is inherently associated with devices implanted in living tissue. FIG. 6 is a graphical diagram (600) illustrating signal attenuations (610, 620 and 630) from the skin interface for an example implanted microstimulator. As the depth from the skin interface increases, the signal attenuation also increases. Graph 610 illustrates the attenuation for one example frequency, while graphs 620 and 630 each illustrate higher frequency signals attenuation characteristics. In one example, an attenuation of about 20 dB is observed for a 400 MHz signal in a shallow implant (e.g., implanted very near the skin surface).

The attenuation paths between the external and internal systems due to the skin interface have an approximately reciprocal attenuation characteristic. In other words, the attenuation from the MCU to the implanted wireless device is approximately the same as the attenuation from the implanted wireless device to the MCU. Assuming the presence of a non-thermal external interference or noise source, and assuming equal transmit power from both the MCU and the body implanted wireless device, the MCU will perceive a reduced signal-to-noise ratio due to the presence of an interference/noise source. If a fairly narrow-band interferer is present, than the common frequencies used for wireless communications can result in performance degradation. For example, if a 7 dB signal-to-noise-plus-interference ratio is required for a successful wireless communication, than a narrowband interference signal with a received signal strength about 3 dB weaker than the relevant implanted wireless device may prevent or mask a valid communication from being successfully received by the MCU. This same interfering signal can be attenuated by at least 20 dB in reaching the implanted wireless device, and thus would be about 23 dB below the received MCU signal, and thus has a negligible effect on the signaling path from the MCU to the implanted wireless device.

The minimum frequency width (bw) that can be observed in a received signal is inversely related to the capture time interval (T=1/bw). In order to conserve power consumption, some wireless devices are not continuously capturing signals via their radio sub-system. Instead, the wireless device will typically be operated in a low power mode until radio reception is required over a radio capture interval. Since the minimum frequency width (bw) is inversely related to the capture time interval, there may not be enough to capture narrow width signals. For example, when a receiver capture time in a wireless device is approximately 6 microseconds (μs), the corresponding minimum observable bandwidth is 160 kHz=⅙ μs. Thus, in some example systems the wireless devices cannot perform a useful narrowband excision operation. Since the MCU is externally located, the MCU typically does not have the same limited power requirements as the implanted wireless device and can thus be powered up for longer periods of time. A longer receiver capture interval can be used so that narrower frequencies can be separated. For example, when the receiver capture time interval in the MCU corresponds to 100 microseconds (ms), the corresponding minimum observable bandwidth is about 10 kHz=1/100 ms. This described communication time differences demonstrates an asymmetrical communication system, where the implanted wireless devices (e.g., transponders) provide short burst communications to the MCU, which uses a much longer signal captures interval to improve frequency resolution.

An implementation to undertake transmissions from an implanted wireless device (e.g., a microstimulator or microtransponder) to an external MCU is illustrated by U.S. Pat. Nos. 6,164,284; 6,564,807; 6,208,894 and 6,315,721, which are all incorporated by reference in their entireties. As described in those references, a frequency range of about 410-415 MHz can be utilized in short transmission bursts. Transmission of signals from the MCU to the implanted device are received by the implanted wireless device, despite transmission losses in air and due to the attenuation effects of body tissue, because the MCU is capable of operation at higher transmission power levels and for longer transmission intervals than the microstimulators. On the other hand, the relatively short transmission interval and the low power transmission capability of the implanted wireless device, which is impacted by about a 20 db loss, that the transmitted signal undergoes traveling through body tissue, limits relative reception of implanted wireless device transmissions by the MCU.

Narrowband noise emanating from external sources in the vicinity of the microstimulator—MCU combination can further interfere with reception of microstimulator signals by the MCU. It is assumed that the interference signals have a frequency of about 412 MHz. [The interference frequencies could be any frequency within the 410-415 MHz range.] Interference signals of much lower or much higher frequencies will have a marginal interference effect on the signal transmitted by the microstimulator and are not of a major concern.

The wireless device transmitters are not mutually phase coherent, due to small frequency errors, and the fact that they can be physically located at varying distances with respect to the MCU. Thus, in general a collection of successive wireless device transmissions will not produce the narrow spectral lines one might see with a single lengthy transmission from a single wireless device. As a consequence of this, a single strong spectral line is generally caused by an external narrowband interferer.

In practice, an example MCU can capture about 100 microseconds of samples, which can correspond to about 1000 complex samples (I/Q samples) at a sample rate of 10 MHz. The MCU can later perform a transform from the time domain to another domain where the frequency spectrum of the captured samples can be evaluated to identify a narrowband interference signal. In one example, the time domain samples are transformed into a frequency domain representation using a Fast Fourier Transform (FFT). The frequency resolution of the described example operation is about 10 KHz for approximately 1000 complex samples.

The above described observations and limitations will become clear in light of the following example implementations that follow herein.

Example MCU Receiver

Figure 3:
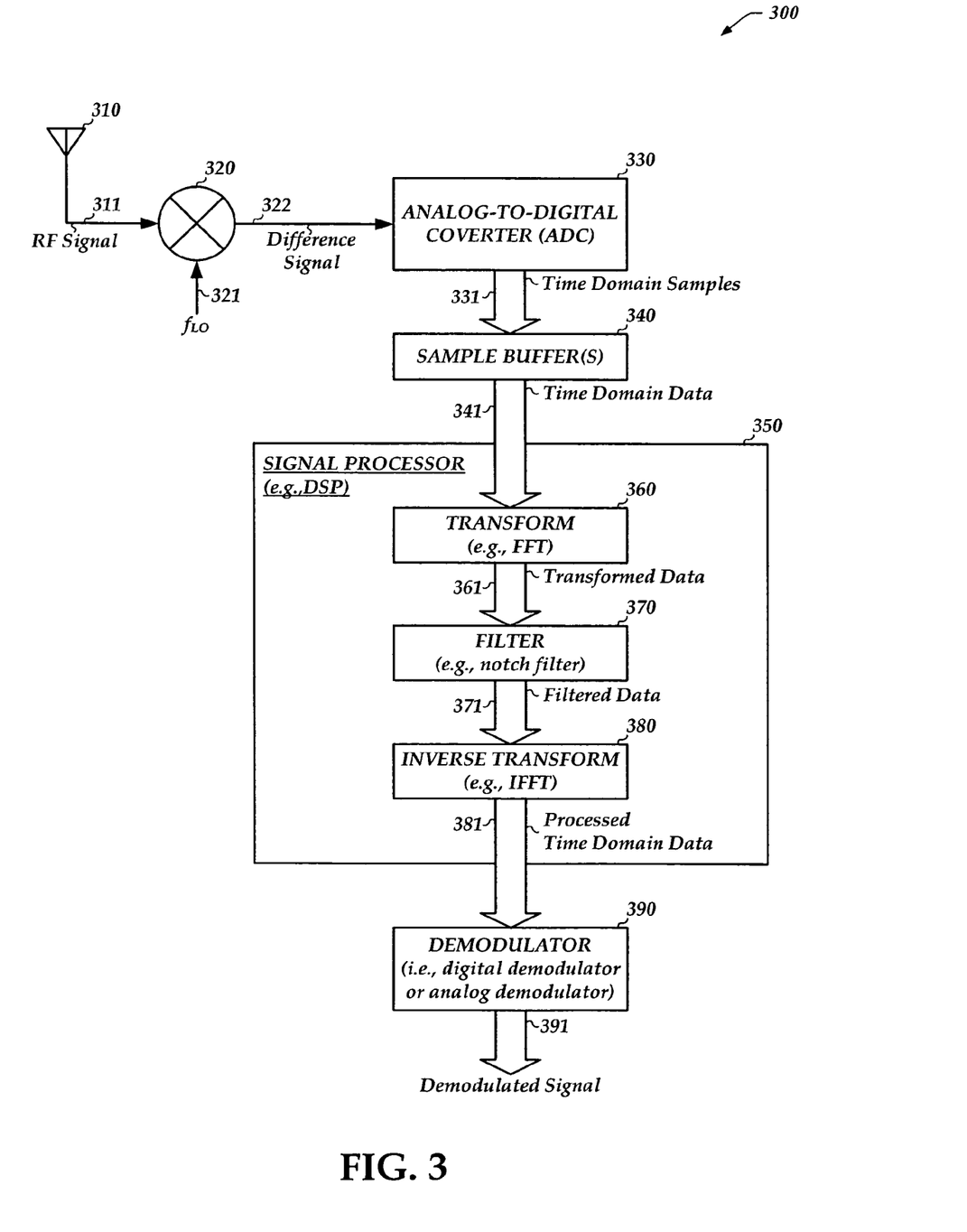
FIG. 3 is a schematic diagram illustrating an example receiver in an MCU.

FIG. 3 is a schematic diagram illustrating an example receiver in an MCU (300) that is arranged in accordance with at least some aspects of the present disclosure. MCU 300 includes an antenna (310), a mixer (320), an analog-to-digital converter (ADC 330), one or more sample buffers (340), a signal processor (350), and an optional demodulator (390). The example signal processor (350) also illustrates a transform block (360), a filter block (370), and an inverse transform block (380).

Referring to FIG. 3, antenna 310 of the MCU (300) receives RF signals (311) that have an input signal frequency corresponding to $f_{IN}$. The RF signals (311) are applied to mixer 320, which also receives a local oscillator signal with a frequency ($f_{LO}$), which down-converts the signal from the RF frequency band to a baseband signal spectrum as a difference signal (322) with a frequency that corresponds to the difference between the input signal frequency ($f_{IN}$) and the local oscillator frequency ($f_{LO}$). The difference signal (322) is coupled from the output of the mixer (320) to an input of the ADC (330). The ADC (330) captures samples of the difference signal (322) and converts the captured samples from an analog signal in the time domain to a digital data signal (Time Domain Samples 331). The output of the ADC (330) is coupled to one or more sample buffers (340), which operate as a memory that stores the time domain samples (331) for later processing. The time domain data (341) is retrieved from the output of the sample buffer (340) and provided to the signal processor (350) for further processing.

The signal processor (350) can be implemented as a digital signal processor (DSP) or some other equivalent means that can transform the time domain data into another domain for removal of the narrowband interference signal. As illustrated in the example of FIG. 3, the transform block in the signal processor (350) is arranged to transform (e.g., a Fast Fourier Transform or FFT) the time domain data (341) into another domain (e.g., a frequency domain). The transformed data (361) is then filtered (e.g., notch filtered) by the filter block (370) to remove the characteristic of the narrowband interference signal and to generate the filtered data (371) in the transformed domain. The filtered data (371) can then either be inverse transformed (e.g., an Inverse Fast Fourier Transform or IFFT) back into the time domain as Processed Time Domain Data (381) by the inverse transform block (380), or further processed in the transform domain can be performed such as for demodulation of data, commands, or other pertinent information. Although the transform block (360), filter block (370), and inverse transform block (380) are illustrated as discrete functional blocks, their functions may be combined and/or partitioned into other functional and/or physical blocks as may be desired in an implementation.

For example systems where demodulation operations are performed in the time domain, the processed time domain data (381) is coupled to an input of the demodulator (390) where a digital demodulator processes the time domain data to generate demodulated signals (391) for further processing by the MCU (300). Alternatively, the demodulator (390) may include a digital-to-analog converter (DAC, not shown) that converts the processed time domain data (381) into a processed analog time domain data (not shown), that is then demodulated using an analog demodulator to generate the demodulated signal (391).

In one example, the RF signals (311) are provided in a frequency range of about 410 to 415 MHz, and the mixer (320) is operated with a local oscillator frequency ($f_{LO}$) of about 408 MHz. For this example, the difference signal (322) has a frequency in a range of about 2-7 MHz, and thus an effective bandwidth of about 5 MHz. The sample buffers in this example can store at least 24,000 complex samples from the output of ADC (330) conversion.

Once the captured samples are presented in the transformed domain, large amplitude spectral peaks can be identified and excised from the received signals. An inverse transform (e.g., an inverse FFT) can then be used to transform the signals from the transformed domain back into the time domain representation for further processing. It is important to note that the output signals in the time domain are identical to the input signals from the receiver when no excision is performed (ignoring minor differences from quantization, and arithmetic round-off errors).

A demodulation process can be applied to the time domain signals after the inverse transformation process is completed. The demodulation process can be executed as a digital demodulation that operates on a stream of digital data, or as an analog demodulation process that operates on continuous time domain signals. The demodulated signals can then be processed by the MCU for any desired operation such as extraction of command instructions, extraction of data from sensors, or any other reasonable purpose.

In some alternative implementations, the demodulation process can be performed in the transformed domain without first performing an inverse transformation back to the time domain. In such a fashion a spectrum associated with the signals in the transformed domain may correspond to demodulated information such as commands, data, or other pertinent information that is processed by the MCU. A simple look-up-table (LUT) can identify signatures (e.g., an expected frequency spectrum) in the transform domain for demodulated signals. A correlation between the observed spectrum in the transform domain and the LUT signatures can be performed to identify the appropriate demodulated signals.

Note that a single microstimulator transmitter operated for the customary 6 microsecond interval generates a spectrum whose frequency resolution is limited in resolution by the same 6 microseconds. The MCU with its longer capture and processing period can separate out narrow band signals without removing an entire 160 KHz wide spectral chunk, which action could greatly degrade the received data.

Example Frequency Domain Analysis in the MCU Receiver

Figure 4:
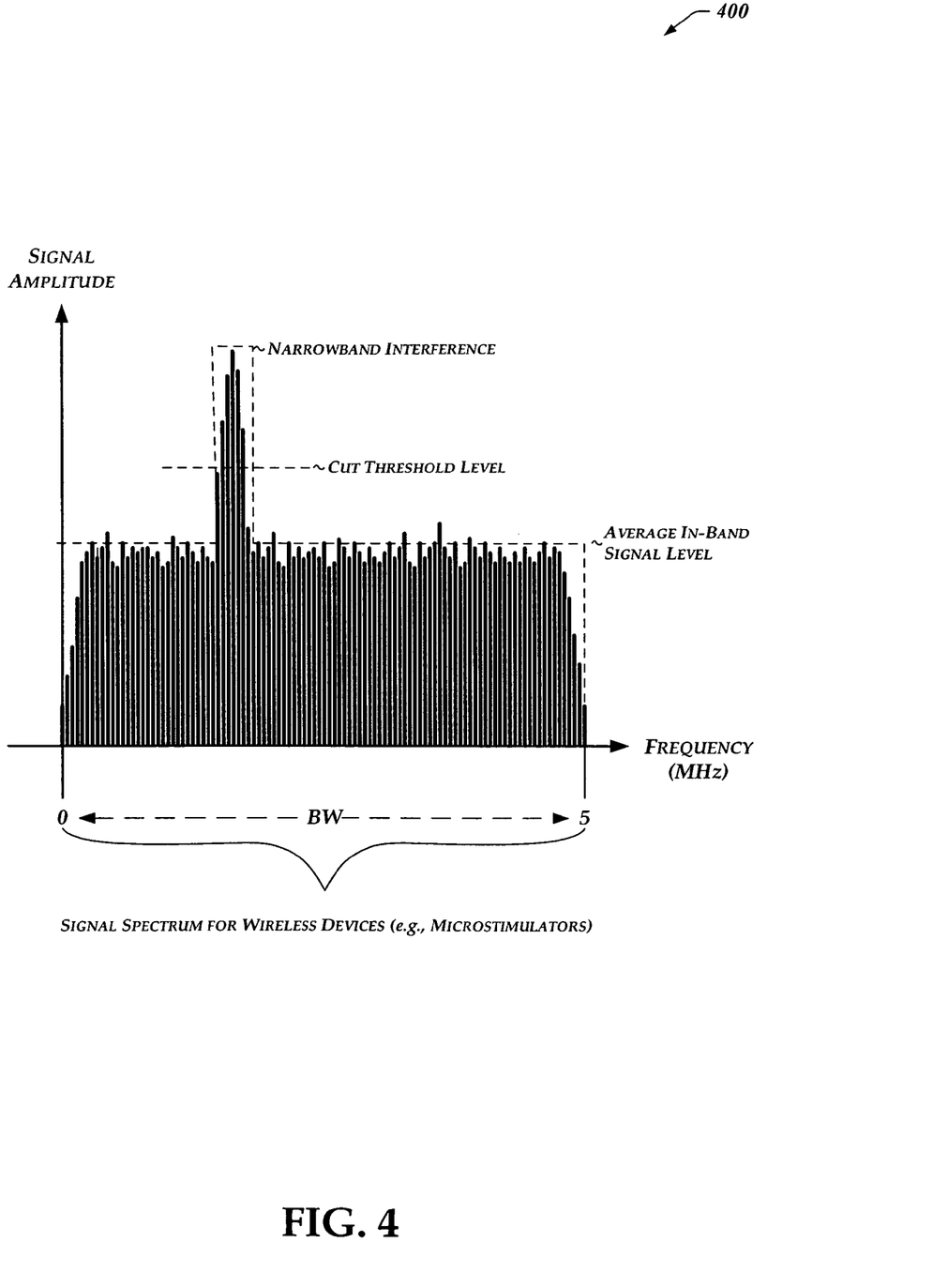
FIG. 4 is a graphical diagram illustrating an example frequency spectrum for signals received from a wireless device by an MCU that is in the presence of a narrowband interferer.

FIG. 4 is a graphical diagram illustrating an example frequency spectrum (400) for signals received from a wireless device by an MCU that is in the presence of a narrowband interferer, in accordance with aspects of the present disclosure.

As illustrated in the figure, signal amplitudes for a 5 MHz bandwidth (BW) is illustrated with a baseband frequency spectrum ranging from about 0-5 MHz, which is a reasonable expected signal spectrum for the down-converted transmissions from various wireless devices (e.g., microstimulators)

to an MCU. The illustrated signal spikes represent a frequency domain transform (e.g. an FFT) that is applied to the time domain data from an example captured signal. A peak level for a narrowband interference signal is illustrated at occurring at a frequency of approximately 1.6 MHz. The peak level exceeds the average signal level for the other in-band signals as is depicted in the drawing.

A threshold level for identifying the narrowband interference can also be selected as illustrated by the cut threshold level. Whenever narrowband interference is detected above the cut threshold level, the signal amplitude levels for the spectral terms identified as narrowband interference can be initialized to a desired value such a null value, the average in-band signal level, or any other appropriate signal level. The cut threshold level can be selected based on any reasonable criteria such as, for example, a desired percentage or decibel level above the average in-band signal level, a specific signal amplitude level not based on the average in-band signal level, or any other appropriate criteria.

In one example implementation, a series of FFT bins can be used to represent each of the particular frequency spikes shown in the figure (e.g., $BIN_1$-$BIN_N$ for N discrete frequency bins). The frequency bins can thus divide the signal spectrum into equally spaced frequency ranges (e.g., each bin represents a range of frequencies with a width of 5 kHz, or some other desired frequency range such as 10 KHz, 15 kHz, etc.).

The process of excision can be undertaken at the filter block (370) illustrated in FIG. 3. In this process, the value of the contents of each bin is compared to the average value of the contents of all of the bins. In one example, if the interference signal is greater than about 10% as shown by level indicated as A', then the value of interference signal A will be disregarded or excised from the frequency spectrum. Similarly, interference signals B and C can also be disregarded since their signal level is greater than 10% as shown by levels B' and C'. However, interference signal D is shown to be less than 10% greater (indicated by D') than the average value of the bin containing D, indicating that no excision should be taken for $BIN_{12}$. The effect of taking no excision with regard to interference signal D is considered acceptable providing little "contamination" of the true data signal. The 10% threshold value for excision is merely one illustrative example, and larger levels such as 10 or 20 db above the average level could be used, depending on the application.

Excision of any frequencies determined to be interference, can be performed by zeroing the value of the corresponding bin, and/or by clipping or limiting the value of a bin to its average value.

In terms of an example FFT process, 4095 bins can be provided over a frequency band of 5 MHz, with a bin width of about 1.22 KHz, which is relatively small in order to detect an interference signal with a 3 KHz bandwidth. In a design where there are 4095 bins, with each bin having a 3 KHz bandwidth, then the input signal to the FFT has to have a bandwidth of 12.285 MHz.

Subsequent to the process undertaken in filter block 370, an inverse FFT can be taken at block 380 to extract the transmitted data signal received by the MCU from the wireless device (e.g., the a microstimulator or microtransponder. The output of the IFFT is provided to demodulator 390. However, as described previously, in some implementations it may be desirable to perform the demodulation operation in the transformed domain. For example, a microstimulator signal may have a frequency signature that includes one or more tones (i.e., individual frequencies) that can be referred to in a look-up table to translate directly into demodulated data signals.

Example Process Flow for MCU Receiver Operation

Figure 5:
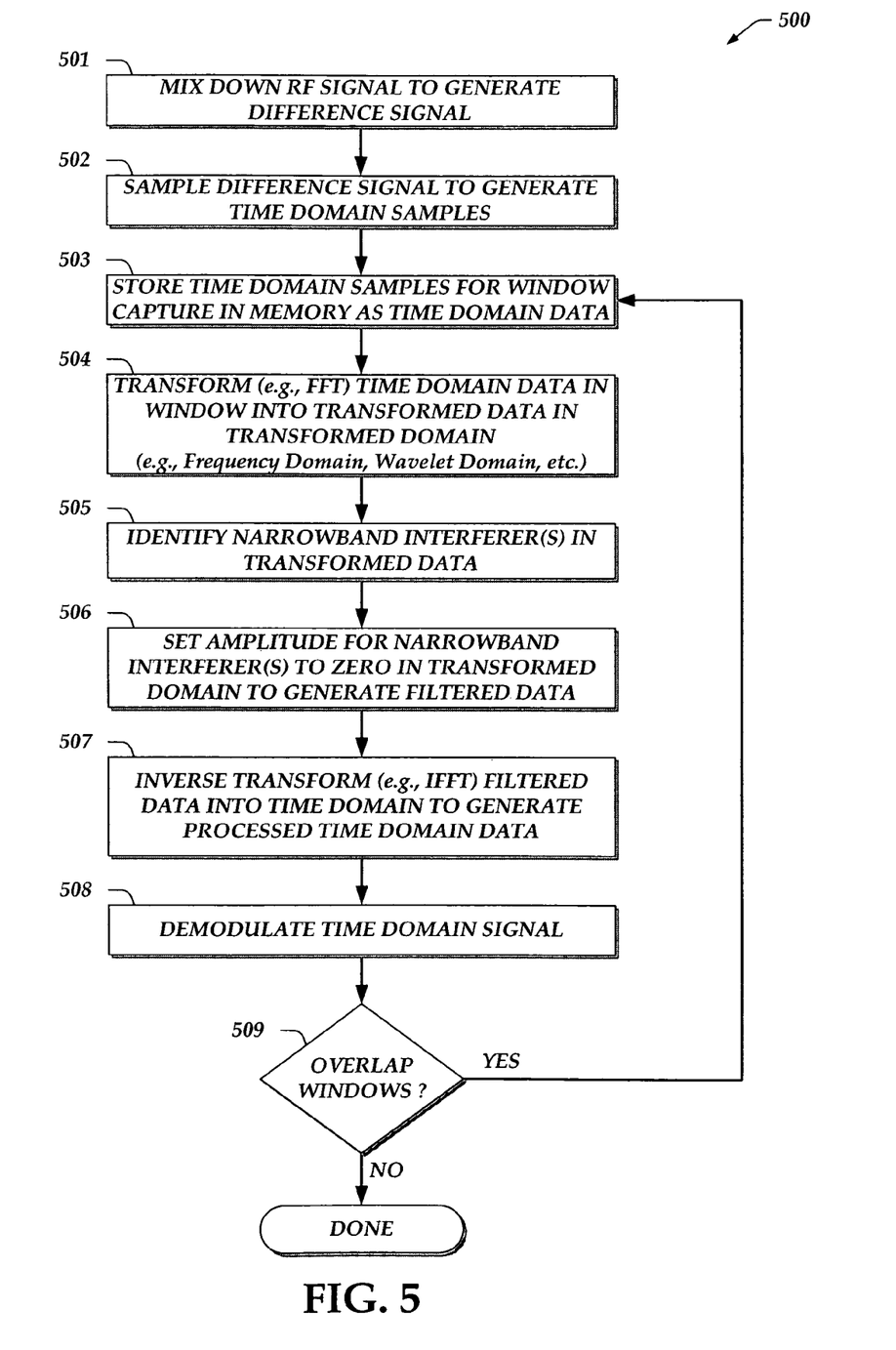
FIG. 5 is a flow chart illustrating the operation of an example receiver in an MCU.

FIG. 5 is a flow chart (500) illustrating the operation of an example receiver in an MCU, arranged in accordance with at least some aspects of the present disclosure. Flow chart 500 includes processing blocks 510-509.

At block 501, the receiver is arranged to mix down the received RF signal (e.g., with a local oscillator of frequency $f_{LO}$) to generate a difference signal in the baseband frequency range. At block 502, the difference signal is sampled to generate time domain samples (e.g., via ADC 330). A processing loop begins at block 503 and continues to decision block 509.

At block 503, the time domain samples are stored in memory (e.g., sample buffers 340) as time domain data, which can optionally include overlapped windows of data as may be required for accurate transform processing. At block 504, a windowed transform (e.g. and windowed set of data can be FFT processed) is applied to the time domain data to generate transformed data. The transformed data can be in any appropriate domain such as a frequency domain, a wavelet domain, or some other domain by applying an appropriate transformation method (e.g., an FFT, a Cosine transform, a Walsh Transform, a Wavelet Transform, etc.). At block 505, the transformed data is evaluated and narrowband any interference(s) are identified such as previously described (e.g., by evaluating signal levels in the transformed domain, average values, threshold levels etc.). Continuing to block 506, the amplitude (or value) of the identified narrowband interferer(s) are initialized to a desired value (e.g., zero) in the transformed domain and the resulting filtered data is generated. Processing continues at block 507, where an inverse transform is performed on the filtered data and processed timed domain data is generated. At block 508, the time domain data is used for demodulation the time domain signal as previously described. At decision block 509, the processing determines if the overlapped window mode is active. When the overlapped window mode is active, processing continues back to blocks 503-508 so that additional stored samples can be evaluated and overlapped with one another in the transform domain.

The above described process can also be applied over multiple capture intervals to form an extended capture interval. In an extended capture interval, a common narrowband interferer can be identified by processing messages from multiple wireless devices. For example, in one communication methodology a time-division multiplexing scheme can be employed so that each wireless device that is arranged to communicate with a common MCU can be assigned to a time slot. Each time slot may correspond to a receiver capture interval associated with one particular wireless device. However a multiplicity of the wireless devices may communicate with the same MCU over the extended capture interval so that all of the devices that are expected to communicate with the same MCU. After all of the messages are communicated to the common MCU, the MCU can collectively identify a common narrowband interferer using the above described methods (e.g., average value of spectral term, highest value, values above a threshold, etc.).

Ideally, multiple capture intervals are applied to a series of spectral terms with overlapping time domain windows related to the time domain data. By utilizing overlapping windows in multiple capture intervals, a clear spectral term will accumulate above others for a narrowband interferer that is common to the various capture intervals, and/or for multiple wireless devices that transmit their communication messages over an extended capture interval.

In one example, the receiver capture interval for the MCU is longer than the transmit capture interval for a wireless device such as an order of two-to-one, three-to-one, four-to-one, five-to-one, etc. The overlapping windows over the extended capture interval will increase the accuracy of identifying a narrowband interferer. In other examples the receiver capture interval for the MCU is longer than the transmit capture interval for all wireless devices that are communicating with a common MCU. In a simple example, the receiver capture interval will be more than two transmit time intervals, one for each of two wireless devices. However, multiple wireless devices can also communicate multiple times each, extending the receiver capture interval for overlapping time windows further. Also, numerous wireless devices may be utilized in some instances such that a single capture interval for each of the wireless devices collectively results in a receiver interval for the MCU that extends to one-hundred or more transmit intervals for the wireless devices.

Although the electronic systems, circuits, and methods are illustrated by various individual blocks, the scope of the present disclosure should not be interpreted as limited to these discrete blocks. One or more of the blocks may be combined or separated into other blocks that provide a similar functionality. The invention is not limited to the precise configurations and embodiments described above. Various modifications, alternatives, changes, and equivalents will be apparent to those skilled in the art and are considered within the spirit and scope of the present disclosure. Since many embodiments of the invention can be made without departing from the spirit and scope of the invention, the invention resides in the claims hereinafter appended.

What is claimed is:

1. An external communication system for communicating with a limited energy body implanted wireless device that is substantially shielded from a narrowband interference source, wherein the external communication system is arranged to mitigate effects of narrowband interference signals from the narrowband interference source, the external communication system comprising:
   a receiver that is arranged to capture signals associated with a transmission from the limited energy body implanted device during a capture interval for the receiver, wherein a duration of the capture interval for the receiver is substantially greater than a transmit time associated with the transmission, wherein the captured signals include at least one member of the group consisting of: a portion of a message from the limited energy body implanted device, narrowband interference signals, and noise signals;
   a buffer that is arranged to store samples associated with the captured signals; and
   a signal processor that is arranged to process the stored samples, wherein the signal processor is arranged to:
      transform the stored samples from at least a portion of the capture interval into a series of spectral terms by performing a transformation from a time domain into a transformed domain;
      evaluate the series of spectral terms in the transformed domain to identify one or more spectral terms associated with the narrowband interference signals from the narrowband interference source, wherein the identified spectral terms are unrelated to the message from the limited energy body implanted device; and
      initialize the identified terms associated with the narrowband interference source to a desired value to generate a filtered series of spectral terms.

2. The external communication system of claim 1, wherein the desired value for the identified spectral terms for the narrowband interferer is initialized to either a null value or a clipping value.

3. The external communication system of claim 1, wherein the signal processor corresponds to either an analog signal processor or a digital signal processor.

4. The external communication system of claim 1, wherein the signal processor is arranged such that the transformation corresponds to one member of the group consisting of: a Fast Fourier Transform (FFT), a Cosine transform, a Walsh transform, and a Wavelet transform.

5. The external communication system of claim 1, wherein the signal processor is further arranged such that stored samples that are grouped together within a time domain window are transformed together into the series of spectral terms.

6. The external communication system of claim 5, wherein the signal processor is further arranged overlap successive time domain windows with one another.

7. The external communication system of claim 1, wherein the capture interval for the receiver is at least five times longer than the transmit time associated with the transmission.

8. The external communication system of claim 1, wherein the capture interval for the receiver comprises a time domain window that is greater than the transmit time required for the transmission of multiple messages from the limited energy body implanted device, and wherein the signal processor is further arranged to process the captured samples for the time window such that the one or more narrowband interference signals are identified by the signal processor.

9. The external communication system of claim 1, wherein the signal processor is further arranged to store each spectral term in a respective bin from an array of bins after the transformation from the time domain into the transformed domain, wherein each bin from the array of bins represents a portion of a predetermined baseband frequency bandwidth.

10. The external communication system of claim 9, wherein the signal processor is further arranged to transform the stored samples from at least another portion of the capture interval into another series of spectral terms by performing another transformation from the time domain to the transformed domain, and accumulate each respective spectral term from the another transformation in their respective bin from the array of bins.

11. The external communication system of claim 10, wherein the signal processor is further arranged to evaluate the series of spectral terms by comparing the accumulated values in each bin to a threshold value.

12. The external communication system of claim 11, wherein the threshold value for each bin is determined at least in part by the average value associated the respective bin.

13. The external communication system of claim 1, wherein the signal processor is further arranged to inverse transform the filtered series of spectral terms to generate processed time domain data.

14. The external communication system of claim 13, further comprising a demodulator that is arranged to generate a demodulate signal from the processed time domain data, wherein the demodulator corresponds to either an analog demodulator or a digital demodulator.

15. The external communication system of claim 1, wherein the signal processor is further arranged to evaluate the filtered series of spectral terms to identify a signature associated with a demodulated signal.

16. An external communication system for communicating with multiple limited energy body implanted wireless device that is substantially shielded from a narrowband interference source, wherein the external communication system is arranged to mitigate effects of narrowband interference signals from the narrowband interference source, the external communication system comprising:

a receiver that is arranged to capture signals associated with a transmission from multiple limited energy body implanted devices during an extended capture interval for the receiver, wherein a duration of the extended capture interval for the receiver is substantially greater than a transmit time associated with the transmission from each of the limited energy body implanted devices, wherein the captured signals include at least one member of the group consisting of: a portion of a message from each limited energy body implanted device, narrowband interference signals, and noise signals;

a buffer that is arranged to store samples associated with the captured signals; and a signal processor that is arranged to process the stored samples, wherein the signal processor is arranged to:

transform the stored samples from at least a portion of the capture interval into a series of spectral terms by performing a transformation from a time domain into a transformed domain;

evaluate the series of spectral terms in the transformed domain to identify one or more spectral terms associated with the narrowband interference signals from the narrowband interference source, wherein the identified spectral terms are unrelated to the message from the limited energy body implanted device; and initialize the identified terms associated with the narrowband interference source to a desired value to generate a filtered series of spectral terms, whereby the extended capture interval for the receiver is sufficiently long so that a common narrowband interferer can be identified for the multiple limited energy body implanted devices.

17. The external communication system of claim 16, wherein the extended capture interval is sufficiently long so that messages from more than one-hundred captures from the body implanted devices can be correlated to the common narrowband interferer.

18. A method for a main control unit top process communications from at least one limited energy body implanted wireless device that is substantially shielded from a narrowband interference source, wherein the main control unit is arranged to mitigate effects of narrowband interference signals from the narrowband interference source, the method for the main control unit comprising:

receiving an RF signal from an antenna;

mixing the RF signal with a local oscillator signal to generate a baseband difference signal with a limited frequency bandwidth;

sampling the difference signal to generate time domain samples;

storing the time domain samples in a capture memory as time domain data;

transforming at least a portion of the time domain data from the capture memory into a series of spectral terms by performing a transformation from a time domain into a transformed domain;

evaluating the series of spectral terms in the transformed domain to identify one or more spectral terms associated with the narrowband interference signals from the narrowband interference source, wherein the identified spectral terms are unrelated to the message from the limited energy body implanted device; and initializing the identified terms associated with the narrowband interference source to a desired value to generate a filtered series of spectral terms.

19. The method of claim 18, further comprising overlapping successive time domain windows of transformed data.

20. The method of claim 18, further comprising overlapping successive time domain windows of transformed data from multiple capture time intervals over an extended capture interval such that a common narrowband interferer can be identified for each of a plurality of messages from a plurality of limited energy body implanted wireless devices.

\* \* \* \* \*